United States Patent [19]
Johnston

[11] Patent Number: 5,269,087
[45] Date of Patent: Dec. 14, 1993

[54] DEVICE FOR APPLYING SCENT TO FISHING LURES

[76] Inventor: Clarence P. Johnston, P.O. Box 556, Pennington Gap, Va. 24277

[21] Appl. No.: 14,380

[22] Filed: Feb. 5, 1993

Related U.S. Application Data

[63] Continuation-in-part of Ser. No. 820,078, Jan. 13, 1992, Pat. No. 5,187,890.

[51] Int. Cl.⁵ .............................................. A01K 97/06
[52] U.S. Cl. .................................................. 43/4; 43/25
[58] Field of Search .................. 43/4, 25, 54.1, 57.1; 220/262, 263; 118/234, 269

[56] References Cited

U.S. PATENT DOCUMENTS

| | | | |
|---|---|---|---|
| 3,453,770 | 7/1969 | Schultz | 43/57.1 |
| 4,501,222 | 2/1985 | Stone | 118/234 |
| 4,771,564 | 9/1988 | Whitley | 43/4 |
| 5,097,616 | 3/1992 | Johnston | 43/4 |
| 5,170,582 | 12/1992 | Morgin | 43/54.1 |
| 5,187,890 | 2/1993 | Johnston | 43/4 |

Primary Examiner—Kurt C. Rowan
Attorney, Agent, or Firm—Pitts & Brittian

[57] ABSTRACT

An apparatus for the application of a fish-attracting scent or other topical material to fishing lures and other fishing components. This apparatus has a cavity containing an absorbent material into which the scent or other topical material is absorbed, with a cooperating absorbent material attached to a cover. When the cover is in a closed position, any item enclosed between the two absorbent layers is treated with the material absorbed on the layers. A foot pedal mechanism is connected between the body of the apparatus and the cover for raising the cover, preferably to at least ninety degrees from the closed position, to permit full access to the body, and a spring member causes closure of the cover when pressure on the pedal is released. A second cavity within the body permits insertion of weights so that the apparatus will have reduced movement across a support surface when the foot pedal is operated. Alternatively, the body can be fastened to the support surface. Components are configured for ready assembly or disassembly.

17 Claims, 7 Drawing Sheets

DEVICE FOR APPLYING SCENT TO FISHING LURES

This is a continuation-in-Part application based upon parent application Ser. No. 07/820,078 filed on Jan. 13, 1992, which is based upon parent application Ser. No. 07/524,722 filed on May 17, 1990, now U.S. Pat. No. 5,097,616 issued Mar. 24, 1992.

TECHNICAL FIELD

The present invention relates generally to accessory devices for use by fishermen, and more particularly to a device to apply a fish-attracting scent or other treatment to the exterior surface of a fishing lure without contact with a fisherman's hand. In accordance with the invention, the lure can be stored within the device when not in use to maximize the application of the scent, etc.

BACKGROUND ART

A common practice in fishing is to utilize a fish-attracting scent on the fishing lures. Such scents are normally in liquid form, and are applied to the lures by spraying, dabbing, etc. Devices for adding a fish-attracting scent to fishing lures have been known and used heretofore. In particular, the device of D. F. Whitley shown and described in U.S. Pat. No. 4,771,564, issued Sep. 20, 1988, is such a device. However, the various forms of application, including the device of Whitley, often result in contaminating the clothing or hands of a user with the scent.

In addition to the application of a scent, it is often desirable to apply a line dressing to the fishing line to alter its performance in the water. For example, the line can be made to float or sink depending upon the specific treatment material. A device for accomplishing this is described in U.S. Pat. No. 4,501,222 issued to D. A. Stone on Feb. 26, 1985. This device, also, can give rise to contaminating the hands with the dressing contained in a box-like applicator.

My device described and claimed in the aforementioned U.S. Pat. No. 5,097,616 overcomes many of the disadvantages of the prior art. It is a foot-operated device having a cavity into which the lure or other fishing object can be placed. Absorbent pads within the cavity containing the material to be applied, are compressed when a cover is placed on the cavity such that the material absorbed in the pads is partially transferred to the lure, etc. Although this device performs adequately, it is more difficult to build than is desired. Further, due to the internal construction any scent contained in a lower pad can escape into a false bottom of the device. Also, while adapted to be fastened to a supporting surface, there are applications where this fastening was detrimental; however, when unfastened, the device tended to move when the foot lever was operated to insert or remove a lure.

Accordingly, my device described and claimed in the aforementioned patent application Ser. No. 07/820,078 overcame the drawbacks of the device described and claimed U.S. Pat. No. 5,097,616 relating to the movement of the unfastened device during use and the leakage or escape of scent into the false bottom. Although the problem with lack of ease of assembly and disassembly was approached, the device disclosed in the above mentioned patent application is still somewhat complex to assemble (and disassemble).

Accordingly, it is an object of the present invention to provide a device for the application of a scent, or a dressing, to fishing components that does not contaminate clothing or hands of a user.

It is another object of the present invention to provide a device for the application of a scent, etc. to fishing components that is opened by foot pedal operation to permit a fisherman's hands to be free to manipulate a rod and line associated with the lure.

Another object of the present invention is to provide a scent-applying device that will protect the fishing line from damage while connected to a fishing lure within the device when the cover of the device is closed.

A further object of the present invention is to provide a device for applying scent to a fishing lure or the like that can be fully opened to facilitate insertion and removal of the fishing component, this opening being effected by foot pedal operation, with provision being made for automatically closing the cover of the device when foot pressure is removed.

It is another object of the present invention to provide a device of the type described that will have little movement across a supporting surface during operation of the foot lever used for raising the lid or cover thereof.

It is also an object of the present invention to provide a device for the application of scent to a fishing lure or the like in which the components are easily fabricated from a material such as molded plastic, for example, so as to be highly resistant to damage or destruction.

Still another object of the present invention is to provide a device of the type described in which the components are easily assembled or disassembled.

These and other objects of the present invention will become apparent upon a consideration of the accompanying drawings and a full description thereof.

DISCLOSURE OF THE INVENTION

In accordance with the present invention, there is provided a substantially unitized container having a hinged mating cover. Both the cavity and cover carry a pad of an absorbent material into which can be absorbed a desired scent or dressing. When the cover is closed, the pads encase the lure or other object so as to dispense the scent or dressing on the object enclosed thereby. Foot pedal mechanism is attached to the container and cover whereby pressure applied to the pedal causes the cover to be raised to at least ninety degrees from the closed position so as to give full access to the container and the pads. Provision is made to automatically lower the cover to its closed position when pedal pressure is removed. If desired, the device can be more or less permanently attached to a dock, a boat deck, etc. In the preferred embodiment, provision is made to insert weight into an internal compartment so as to make the device more resistant to movement across a support surface as the foot pedal is operated without any permanent attachment. Also, in the preferred embodiment, means are provided for cushioning the edge of the container and/or the cover to prevent damage to a fishing line if such is attached to the object to be treated. Further, in a preferred embodiment the components are manufactured such that assembly and disassembly of the device is simplified.

BEST MODE FOR CARRYING OUT THE INVENTION

Figure 1:
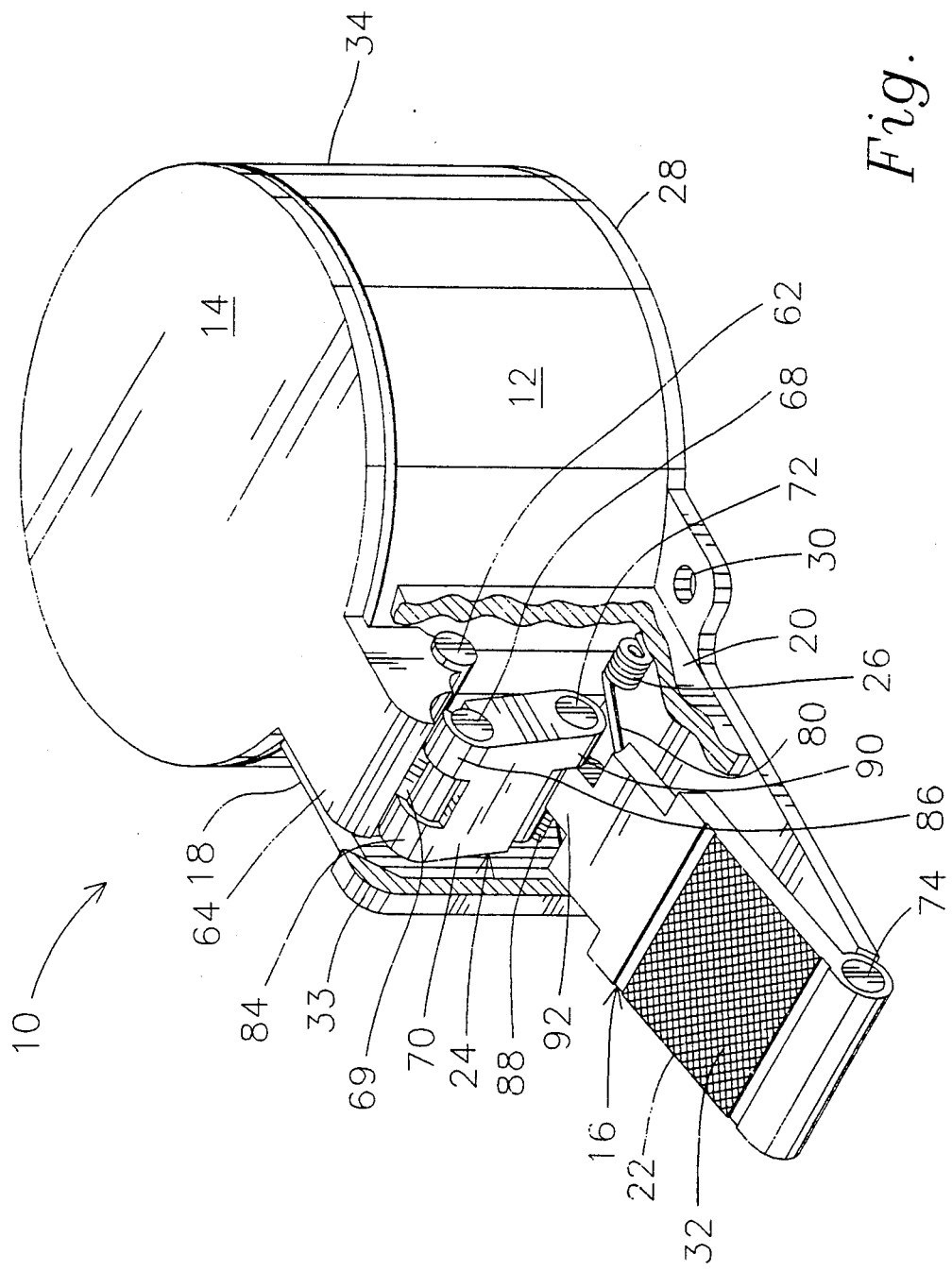
FIG. 1 is a perspective view, partially cut away, of a device constructed in accordance with various features of the present invention.

Referring to FIG. 1, a hands-free, foot-operated device for applying scent or dressing to fishing lures and the like is shown generally at 10. The principal components are a body member 12 defining a cavity 38 and having a base member 28, a cover 14 and an cover operator 16. A pair of "wings" or brackets 18, 20 extend from the body member 12 to carry the cover operator 16 which is made up generally of a foot pedal 22, a lever linkage 24 including a linkage arm 70 and a spring 26 that causes closure of the cover 14 when pressure against the pedal 22 is released. The operation of these components will become clearer in the course of a discussion of FIGS. 3 and 4 hereinafter. In this embodiment, the body member 12 is provided with an attached bottom wall 28 that is also the base of the pedal 22. This bottom wall 28 is provided with at least one aperture 30 (usually a plurality of apertures 30) in an extended portion so that the device 10 can be fastened to a supporting surface, such as a boat deck, a dock, etc., with fasteners (not shown). Although the body member 12 is illustrated as being cylindrical with a circular cover 14, other configurations are within the scope of the present invention.

Figure 2:
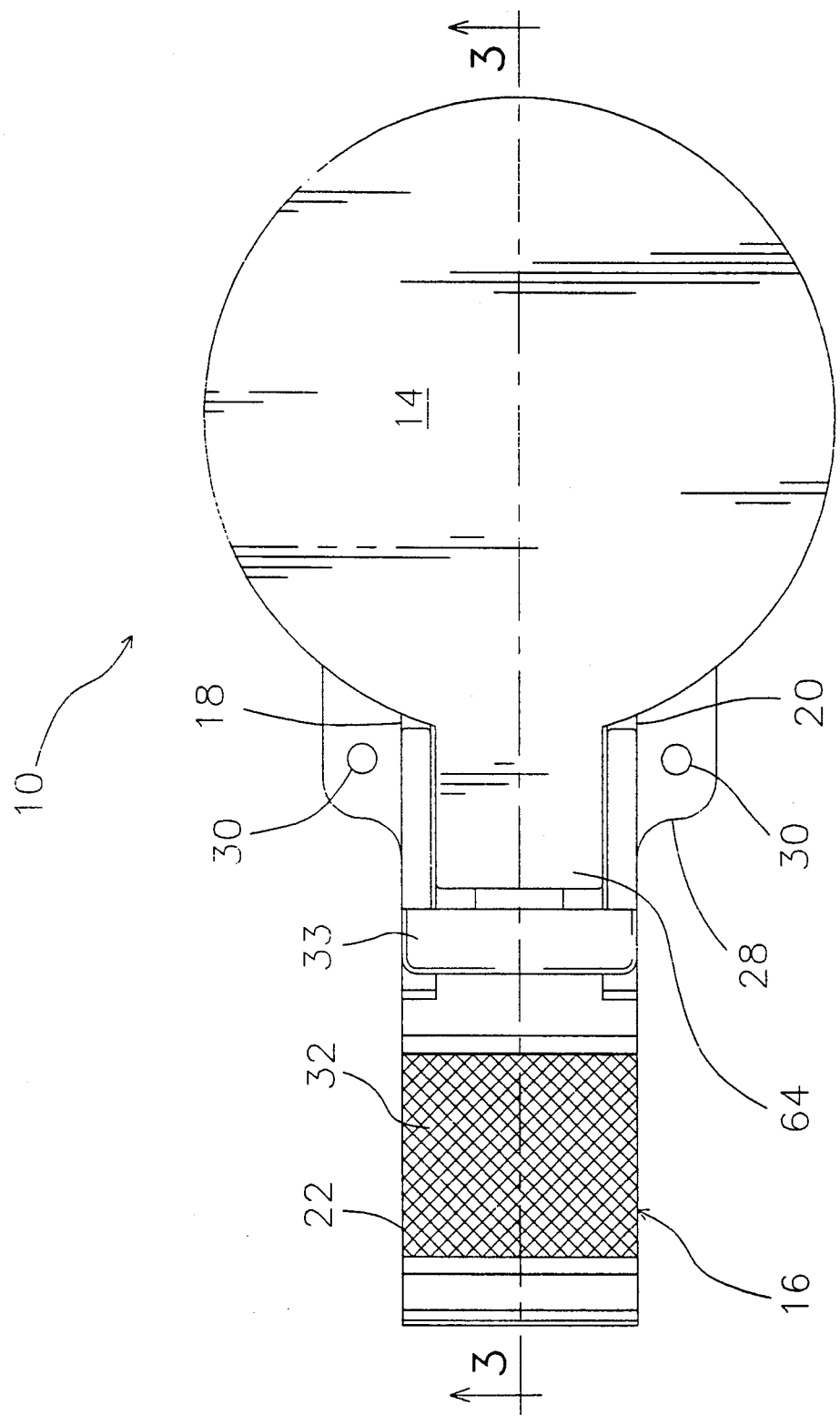
FIG. 2 is a top view of the device of FIG. 1.

A top view of the device 10 is shown in FIG. 2. This more clearly shows that the pedal 22 has a textured surface 32 to increase friction with a user's shoe to prevent slippage. This can be in the form of grooves formed in the surface of the pedal 22, or a textured structure attached to the pedal 22, the former being preferred. This top view also more clearly shows an enclosure 33 that encases the cover lifting lever linkage 24.

Figure 3:
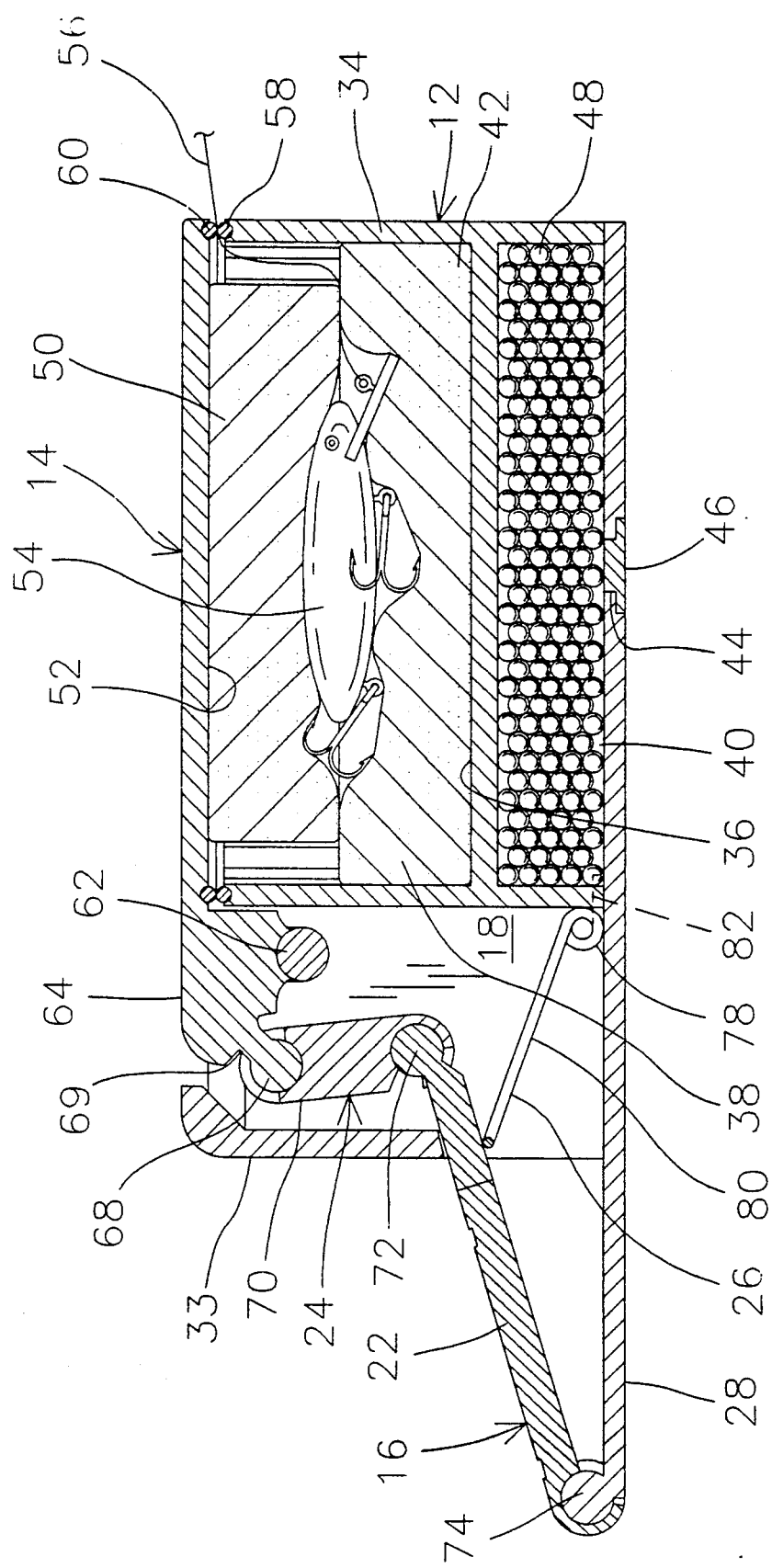
FIG. 3 is a cross-sectional view, taken at 3—3 of FIG. 2, of the device of the present invention.

A vertical cross-sectional view of the present device 10 is shown in FIG. 3. This is taken at 3—3 of FIG. 2. The body member 12 is formed of a cylindrical wall 34 (for a cylindrical embodiment), with a false bottom 36. Preferably this false bottom 36 is formed integrally with the cylindrical wall 34. With this construction, a cavity 38 is formed above the false bottom 36 as well as a cavity 40 between the bottom of the false bottom 36 and the bottom wall 28. The cavity 38 receives a layer of resilient absorbent material 42 into which a fish-attracting scent (or other treating material) can be absorbed. An opening 44 accessing cavity 40 is provided through the bottom wall 28, with this opening 44 having a plug-type closure 46. The opening 44 permits the insertion of weights into the cavity 40, these being typically in the form of shot-type weights 48 as normally utilized by fishermen. Such weights 48 are used to prevent shifting of the device 10 as the foot pedal 22 is operated to open the cover 14.

A second layer of resilient absorbent material 50 is applied to the undersurface 52 of the cover 14. The thickness of this layer 50 is generally the same as layer 42, and the combined thicknesses substantially fill the cavity 38. This causes substantially complete encasement of a fishing object depicted herein as a lure 54. A fishing line 56 is illustrated as attached to the lure 54.

In this embodiment a rim of the wall 34 is provided with an O-ring 58 or like resilient device. A cooperating O-ring 60 (or like device) on the cover undersurface 52 provides sealing of the cavity 38 to minimize escape of scent. Furthermore, these cooperating O-rings 58, 60 guard the fishing line 56 from damage when the cover 14 is closed rapidly.

Figure 4:
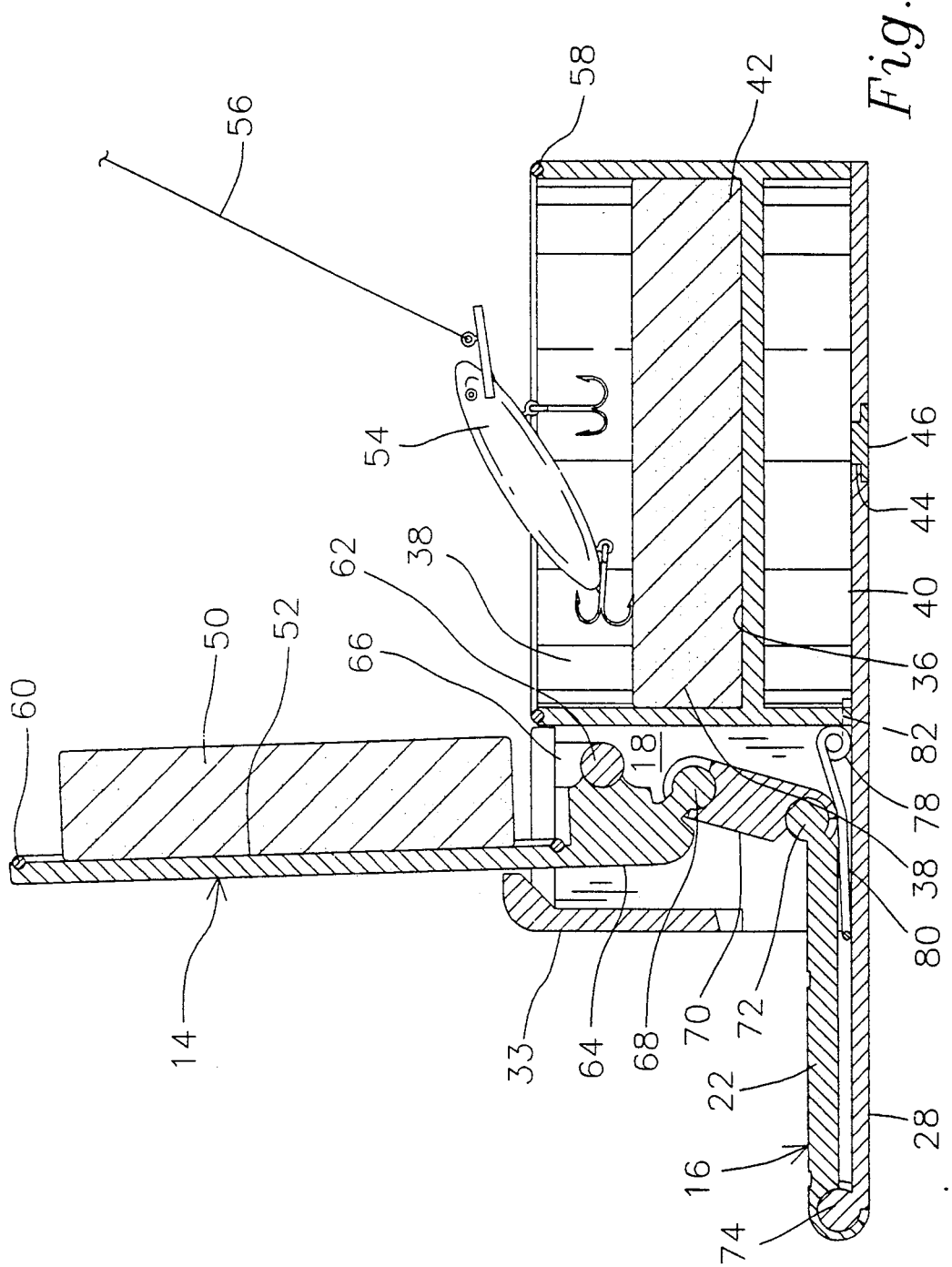
FIG. 4 is a cross-sectional view similar to that of FIG. 3 except showing the position of components when the cover of the device is fully opened so that a lure can be either placed into the device or removed therefrom.

The lever linkage 24 used for lifting the cover 14 is depicted in this FIG. 3 (and in FIG. 4). This linkage 24 includes a first pivot member 62 extending from opposite edges of a cover extension 64, with this pivot member 62 being journaled in slots 66 (see FIG. 4) in the brackets 1a, 20. Thus, a fixed pivot point is established for the cover 14. A second pivot member 68 is attached to, or formed as part of, the cover extension 64. A web member 69 at the distal end of the cover extension 64 between the first and second pivot members 66, 68 forms a lever arm in the lifting mechanism. A linkage arm 70 joins this second pivot member 68 to a third pivot member 72, this third pivot member being at one end of the foot pedal 22. The opposite end of the foot pedal 22 has a fourth pivot member 74 where it pivotally attaches to the bottom wall 28. As shown, the foot pedal 22 is normally biased upwardly under the influence of a spring member 26. Typically this spring member 26 has a pair of oppositely wound spiral portions 78 and a center loop 80 that bears against the underside of the foot pedal 22 (see FIG. 1). Opposed ends of the spiral portions 78 are anchored at positions (e.g., at locations 82) in the wall 34. Whenever the foot pedal 22 is depressed against the force of the spring member 26, the linkage arm 70 is drawn toward the bottom wall 28 with the result that the cover 14 and its extension 64 are pivoted away from the body member 12 as indicated in FIG. 4. In the preferred embodiment, the enclosure 33 is configured such that the cover extension 64 makes contact therewith only when the cover 14 has been raised greater than ninety degrees. This position permits full access to the cavity 38 for insertion or removal of fishing components.

In order to facilitate the fabrication of the pedal operating lever linkage 24, the various portions are configured (see FIGS. 1 and 4) so as to permit ready interconnection thereof when the enclosure 33 is removed. As stated above, the pivot member 62, which is preferably integrally formed with the cover extension 64, is received in slots 66 permitting removal by upward movement when the enclosure 33 is absent. The second pivot member 68 is typically integrally formed with the web member 69 and is slidably received in upper portions 84, 86 of the linkage arm 70 so that this joint can be made or separated by transverse motion (along the axis of the second pivot member 68). The opposite end of the linkage arm 70 is similarly formed with portions 88, 90 that engage the third pivot member 72 typically formed integrally with a web member 92 at the end of the foot pedal 22 permitting engagement (or separation) by sliding motion.

Figure 5:
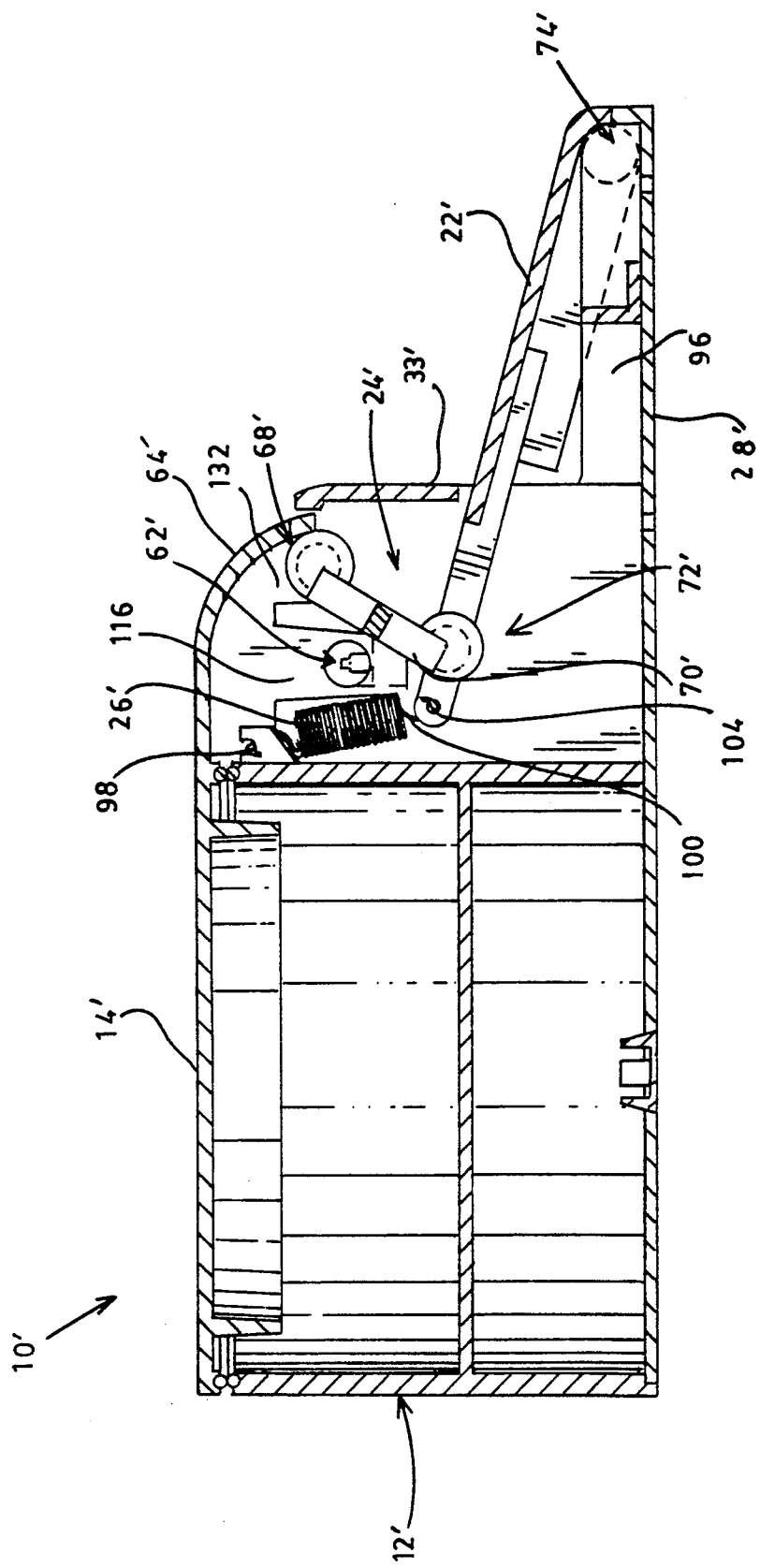
FIG. 5 is a cross-sectional view of an alternate embodiment of the device of the present invention with the foot pedal in an upward position.
Figure 6:
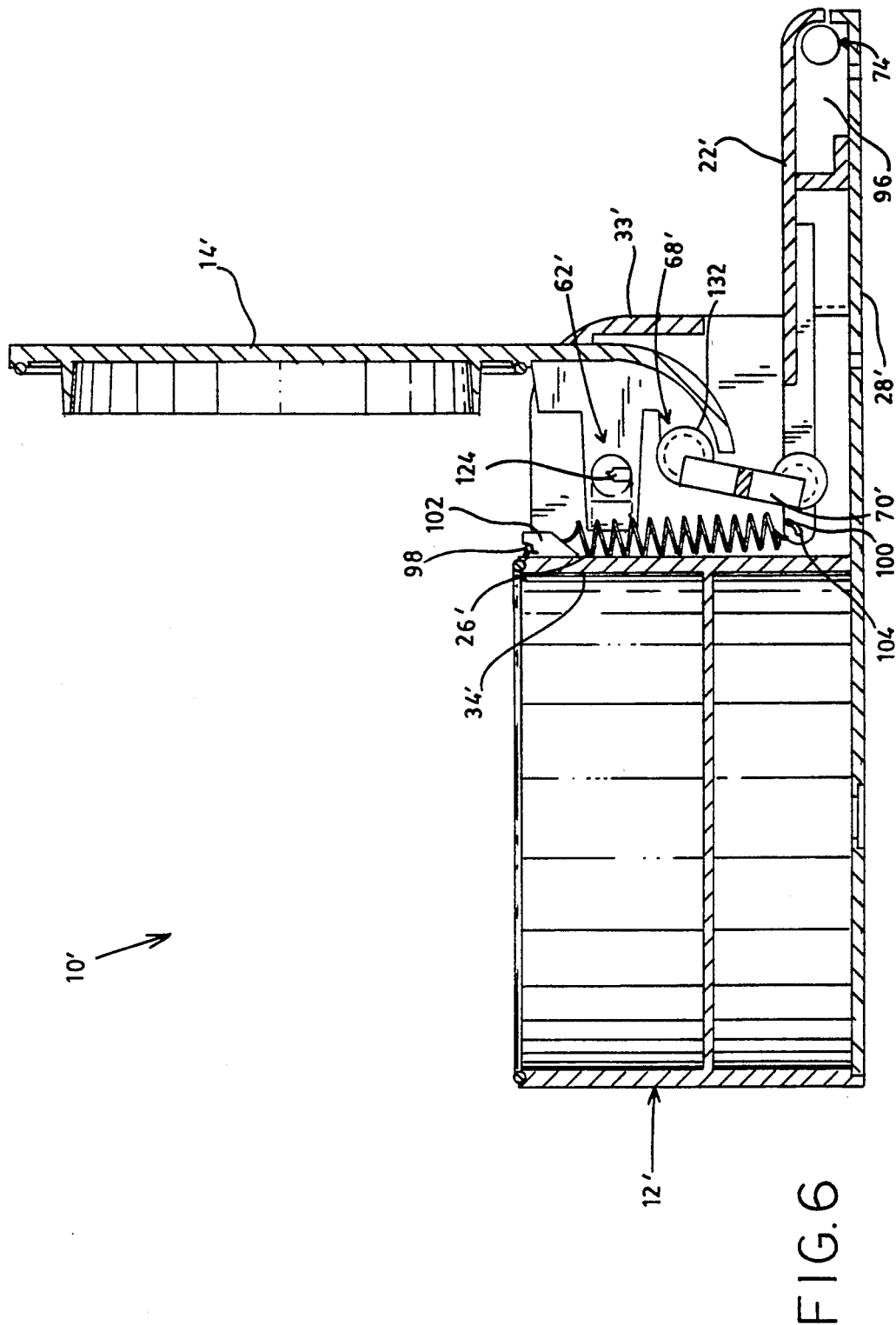
FIG. 6 is a cross-sectional view of the alternate embodiment of FIG. 5 with the foot pedal forced downward to lift the cover.
Figure 7:
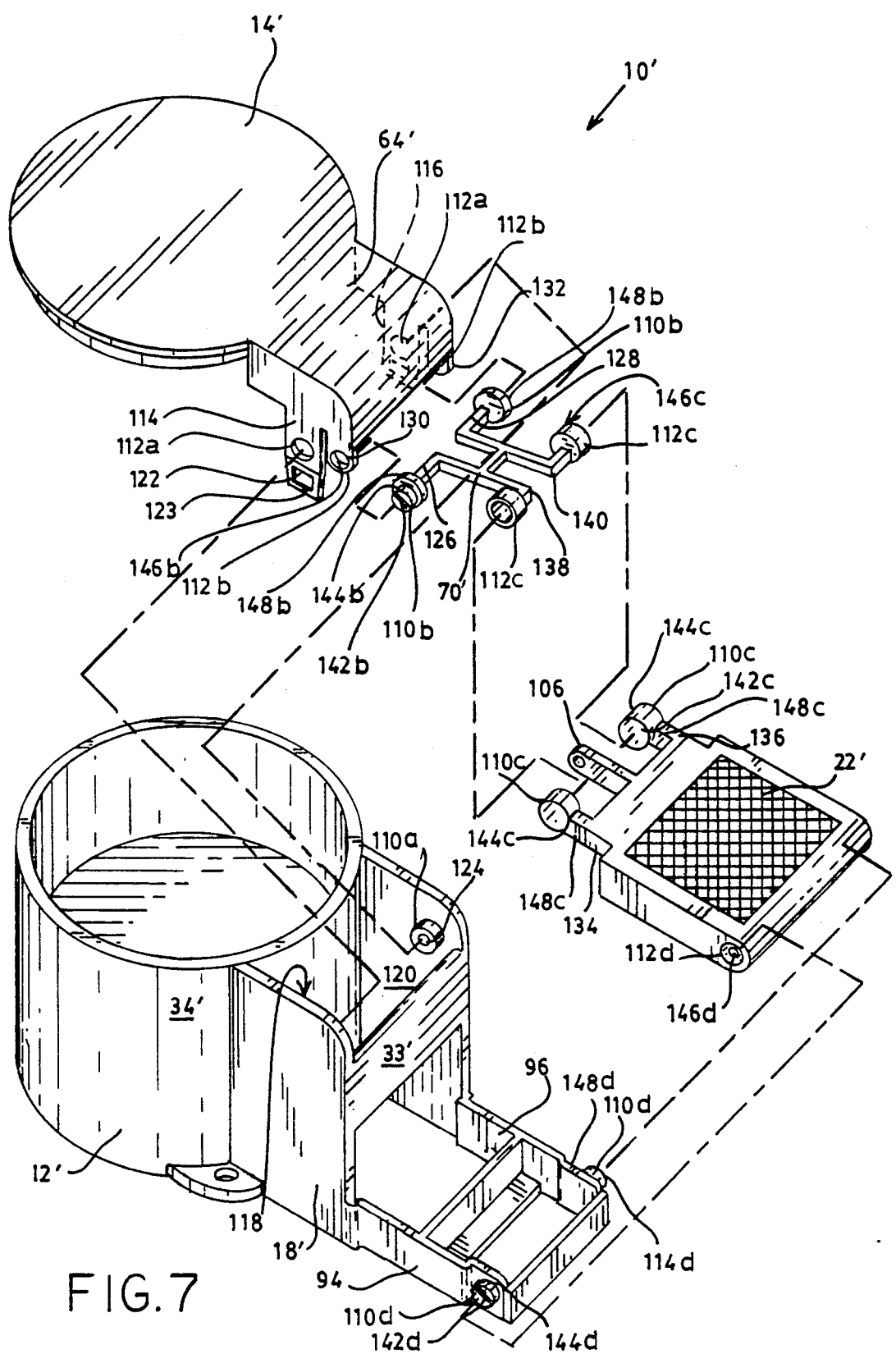
FIG. 7 is a perspective view of the components of the alternate embodiment of FIG. 5.

FIGS. 5, 6 and 7 show an alternate embodiment of the improved device for applying scent to fishing lures 10'. Components of the improved device 10' which are similar to that of the improved device 10 are designated with like numerals which are primed. More specifically, FIGS. 5, 6 and 7 show an alternate embodiment of the lever linkage 24' used for lifting the cover 14', the improved device 10' is otherwise constructed and used in a similar manner as described above.

In the alternate embodiment the lever linkage 24' includes a first pivot member 62' which is journaled in the brackets 18', 20'. The first pivot member 62' is a fixed pivot point. A second pivot member 68' is located at the distal end of the cover extension 64'. The distance on the cover extension 64' between the first pivot member 62' and the second pivot member 68' forms a lever arm in the lifting mechanism. A linkage arm 70' (more clearly shown in FIG. 7) joins the second pivot member 68' to a third pivot member 72'. The third pivot member is located at one end of the foot pedal 22'. The opposite end of the foot pedal 22' has a fourth pivot member 74' which is pivotally attached to the bracket extensions 94, 96 carried by the brackets 18', 20'. The fourth pivot member 74' is also a fixed pivot point. As shown in FIG. 5, the foot pedal 22' is normally biased upwardly under the influence of a spring member 26'. The spring member 26' defines a first and second end hook-like fastener 98, 100. The first end hook-like fastener 98 is releasably secured to a wall hook 102 located at an upper location on the outer portion of the cylindrical wall 34' between the brackets 18' and 20'. The second end hook-like fastener 100 is releasably connected to an eyelet 104 defined by a central extension 106 of the foot pedal 22' (more clearly seen in FIG. 7). The improved device 10' of the alternate embodiment operates in essentially the same manner as the previously described embodiment. When the foot pedal 22' is depressed against the force of the spring member 26', the linkage arm 70' is drawn toward the bottom wall 28' with the result that the cover 14' and the cover extension 64' are pivoted away from the body member 12', as indicated in FIG. 6. Preferably, the enclosure 33' is configured such that the cover extension 64' makes contact with the enclosure 33' when the cover 14' has been raised greater than ninety degrees. In the alternate embodiment the first 62', second 68', third 72', and fourth 74' pivot members are comprised of similar components which cooperate in a similar manner to establish pivoting points. The main components, as shown in FIG. 7, are preferably fabricated from a resilient material such as plastic. The first 62', second 68', third 72' and fourth 74' pivot members are generally comprised of a set of substantially circular extensions 110a, 110b, 110c, 110d, respectively, and a set of substantially circular receivers, 112a, 112b, 112c, 112d, respectively. The receivers 112a, 112b, 112c, 112d are configured such that each one receives a respective circular extension 110a, 110b, 110c, 110d in a manner such that a pivot point is established. The components of the first 62', second 68', third 72' and fourth 74' pivot members are fabricated and constructed such that they permit substantially axial motion with respect to the respective pivot member axis. The first 62' and fourth 74' pivot members are fixed pivot points. The second 68' and third 72' pivot members are capable of limited axial rotation.

As in the previous embodiment described, in order to facilitate the fabrication of the lever linkage 24', the various portions of the improved device 10' are configured so as to permit ready interconnection thereof when the enclosure 33' is removed. The individual components and how they are joined are shown in FIG. 7.

The first pivot member 62' is established by inserting the circular extension 110a into the circular receiver 112a. In the preferred embodiment as depicted in FIG. 7, the receiver 112a is defined by the first wings 114, 116 which extend downward from an intermediate location on the cover extension 64'. The first wings 114, 116 are configured to fit within the inner walls 118, 120 of the brackets 18', 20'. The first wings 114, 116 are further configured to be resilient such that they can be forced inward a specified distance with respect to the cover extension 64' and return their initial position when the force is removed. The first wings 114, 116 further define a wedged tab 122 with an edge 123. The circular extensions 110a are mounted on the interior wall 118, 120 of each bracket 18' and 20'. For connection of these components, the edge 123 of the wedged tab 122 contacts the circular extension 110a which begins to force the first wings 114, 116 inward. The increasing angle of the wedged tab 122 forces the first wings 114, 116 inward in an axial direction with respect to the first pivot member 62' axis such that the receiver 112a is able to receive the circular extension 110a thereby establishing a fixed pivot point.

Of course it will be noted by those skilled in the art that in an alternate embodiment the circular extension 110a can be carried by the first wings 114, 116 and the receiver 112a can be defined by the brackets 18' 1 20' to be an opening which can receive the circular extension 110a.

In the preferred embodiment depicted, the circular extension 110a is configured to ease its release from the receiver 112a. The circular extension 110a is configured such that there is an indentation 124 in a lower portion of each extension 110a in which a tool, such as a screwdriver, can be inserted to force the first wings 114, 116 in an axial direction with respect to the first pivot member 62' away from the interior walls 118, 120 of each bracket 18', 20' and the respective circular extensions 110a.

The second pivot member 68' is established by inserting the circular extensions 110b which are carried by the first end or upper branches 126, 128 of the linkage arm 70' into receiver 112b which is defined by second wings 130, 132 carried at the distal end of the cover extension 64'. The upper branches 126, 128 and the second wings 130, 132 are configured to be resilient such that they permit axial motion with respect to the axis of the second pivot member 68' and return to their initial position when axial forces are no longer present.

The third pivot member 72' is established by inserting the circular extension 110c carried by the arm extensions 134, 136 of the foot pedal 22' into the receivers 112c carried by the second end or lower branches 138, 140 of the linkage arm 70'. The arm extensions 134, 136 and the lower branches 138, 140 of the linkage arm 70' are configured to be resilient and to allow axial motion with respect to the axis of the third pivot member 72' and return to their initial position when the axial forces are no longer present.

The fourth pivot member 74' is established by inserting the circular extensions 110d, carried by the bracket extensions 94, 96, into the receivers 112d, defined by the foot pedal 22' at its distal end. The bracket extensions 94, 96 and the distal end of the foot pedal 22' are configured to be resilient and permit axial motion with respect to the fourth pivot member 74' and return to their initial position when the axial forces are no longer present.

In the preferred embodiment, the components of the second 68', third 72' and fourth 74' pivot members are connected in a similar manner and therefore will be described together. The circular extensions 110b, 110c, 110d each define a beveled end face 142b, 142c, 142d with an edge 144b, 144c, 144d. The distance between the respective edges 144b, 144c, 144d of each circular extension 110b, 110c, 110d is such that the edges 144b, 144c, 144d can contact the edges 146b, 146c, 146d of the respective receivers 112b, 112c, 112d. The increasing angle of the beveled end face 142b, 142c, 142d will force the respective receivers 112b, 112c, 112d in a substantially axial direction, with respect to the respective pivot member, and to a position in which the circular extensions 110b, 110c, llod can be received by a respective receiver 112b, 112c, 112d. As stated previously, the respective components of the pivot members are resilient such that they permit axial motion and will return to their respective initial positions when the axial forces are no longer present.

Each circular extension 110b, 110c, 110d is constructed such that it defines a stop 148b, 148c, 148d to prevent further lateral motion beyond the reception of the circular extension 110b, 110c, 110d into the receiver 112b, 112c, 112d.

Of course it will be noted by those skilled in the art that the locations of any or all pairs of receivers 112b, 112c, 112d and circular extensions 110b, 110c, 110d can be the opposite of how they are depicted in FIG. 7 such that a pair of receivers replace their respective extensions and the respective extensions replace the receivers.

Disassembly of the components of the second 68', third 72' and fourth 74' pivot members can be accomplished in a similar manner as that to assemble the components. The edges 144b, 144c, 144d of the circular extensions 110b, 110c, 110d can contact the edges 146b, 146c, 146d of the respective receivers 112b, 112c, 112d. The increasing angle of the beveled end face 142b, 142c, 142d will force the respective receivers 112b, 112c, 112d in a direction and to a position in which the circular extensions 110b, 110c, 110d can be released from the respective receiver 112b, 112c, 112d.

From the foregoing, it will be recognized that an improved device has been provided for the application of scent (or other treatment materials) to fishing components such as fishing lures. The construction facilitates fabrication, and minimizes the loss of treating materials absorbed upon absorbent pads contained within the device. The assembly and disassembly of the device has been greatly simplified. The cover of the device can be moved with a foot pedal to a position to permit full access to the interior, and the cover is moved to the closed position automatically when pressure on the foot pedal is removed. A second cavity within the device provides for the insertion of weights so that the device does not necessarily have to be fastened to a support surface to prevent undesired motion when the foot pedal is operated.

While specific construction features are shown and described, these are not for the purpose of limiting the scope of the invention. Rather, the invention is to be limited only by the appended claims or their equivalents.

I claim:

1. An apparatus for treating fishing components with a topical treating liquid without contact of a user's hands or clothing, said apparatus comprising:

a body member defining a cavity having a peripheral rim, said body member further having a base member and bracket members extending from an exterior surface of said body member, said bracket members having bracket extensions extending from a lower end of said bracket members and being supported by said base member;

a cover member for closing said cavity of said body member, said cover member having a lower surface for engaging said peripheral rim, said cover member having a cover extension for overlying said upper edge of said bracket members, said cover extension carrying a first set of wings and a second set of wings, said first set of wings extending downward from opposite sides of said cover extension at an intermediate location, said second set of wings extending downward from opposite sides of said cover extension at a distal end of said cover extension;

a resilient and absorbent pad contained in said cavity for retaining said topical treating liquid;

a second resilient and absorbent pad attached to said lower surface of said cover member for retaining said topical treating liquid, said second absorbent pad substantially contacting said absorbent pad within said cavity when said lower surface of said cover member is in contact with said peripheral rim whereby said absorbent pad and said second absorbent pad substantially enclose said fishing components when placed within said cavity;

a first pivot member located at said first set of wings of said cover extension, said first set of wings being journaled in said bracket members to provide a fixed pivot position for said cover member;

a second pivot member located at said second set of wings of said cover extension;

a linkage arm having a first end and a second end, said first end pivotally connected to said second set of wings at said second pivot member;

a foot pedal having a first end and a second end, said first end being pivotally connected to said second end of said linkage arm at a third pivot member and said second end being pivotally connected with a distal end of said bracket extensions at a fourth pivot member, whereby pressure applied to said foot pedal causes axial movement of said linkage arm to cause pivoting of said distal end of said cover extension around said fixed pivot position thereby raising said cover member up to a position to provide access into said cavity; and a spring biasing device to close said cover member against said peripheral rim when pressure is removed from said foot pedal.

2. The apparatus of claim 1 wherein said body member defines a second cavity in a direction toward said base member, said base member defining an opening into said second cavity, said apparatus further comprising a removable closure for said opening, said second cavity and said closure providing for the insertion of weight within said body member to reduce movement of said apparatus during operation of said foot pedal.

3. The apparatus of claim 2 wherein said cavity has a bottom integrally formed with peripheral walls of said body member, said bottom forming an upper surface of said second cavity, said absorbent pad resting on said bottom, and said absorbent pad and said second absorbent pad have substantially equal thicknesses.

4. The apparatus of claim 1 wherein at least one of said peripheral rim of said body member and said under surface of said cover member is provided with a resilient gasket to provide a seal for said cavity and a protection for any fishing line extending from said cavity when said cover member is in a closed position.

5. The apparatus of claim 4 wherein both said peripheral rim of said body member and said under surface of said cover member are provided with a resilient gasket.

6. The apparatus of claim 1 wherein said bracket members carry a plurality of substantially circular extensions on inner surfaces, said first set of wings define substantially circular receivers which receive said plurality of substantially circular extensions in a manner which pivotally connects said first set of wings to said brackets such that said first pivot member is journaled in said brackets.

7. The apparatus of claim 1 wherein said bracket members define a plurality of substantially circular receivers, said first set of wings carry substantially circular extensions which are received by said substantially circular receivers in a manner which pivotally connects said first set of wings to said brackets such that said first pivot member is journaled in said brackets.

8. The apparatus of claim 1 wherein: said second set of wings and said first end of said link-age arm are configured to permit axial motion with respect to an axis of said second pivot member to permit assembly and disassembly of said second pivot member;

said second end of said linkage arm and said first end of said foot pedal member are configured to permit axial motion for assembly and disassembly of said third pivot member; and said second end of said foot pedal and said base member of said body member are configured to permit axial motion for assembly and disassembly of fourth pivot member.

9. The apparatus of claim 1 wherein said spring biasing device comprises a spring member including a first hook-like end and a second hook-like end, said first hook-like end releasably secured to a wall hook carried by an outer wall of said body member at a location between said brackets, said second hook-like end releasably secured to an eyelet defined by a central extension carried by said foot pedal such that said spring member biases said foot pedal in a raised position and said cover member in a closed position.

10. The apparatus of claim 1 further comprising an enclosure member to enclose said first, second and third pivot members, said enclosure member being joined to top edges of said bracket members, said enclosure member configured to contact said extension of said cover member to limit upward travel of said extension and thus said cover member.

11. An apparatus for treating fishing components with a topical treating liquid without contact of a user's hands or clothing with said liquid, said apparatus comprising:

a body member defining a cavity having a peripheral rim, said body member further having a base member and bracket members extending from an exterior surface of said body member, said bracket members having bracket extensions extending from a lower end of said bracket members and being supported by said base member;

a cover member for closing said cavity of said body member, said cover member having a lower surface for engaging said peripheral rim, said cover member having a cover extension for overlying said upper edge of said bracket members, said cover extension carrying a first set of wings and a second set of wings, said first set of wings extending downward from opposite sides of said cover extension at an intermediate location, said second set of wings extending downward from opposite sides of said cover extension at a distal end of said cover extension;

a first resilient and absorbent pad contained in said cavity for retaining said topical treating liquid;

a second resilient and absorbent pad, having a thickness substantially equal to said first absorbent pad, attached to said lower surface of said cover member for retaining said topical treating liquid, said second absorbent pad substantially contacting said first absorbent pad within said cavity when said lower surface of said cover member is in contact with said peripheral rim whereby said first and said second absorbent pad substantially enclose said fishing components when placed within said cavity;

a first pivot member located at said first set of wings of said cover extension, said first set of wings being journaled in said bracket members to provide a fixed pivot position for said cover member;

a second pivot member located at said second set of wings of said cover extension;

a linkage arm having a first end and a second end, said first end pivotally connected to said second set of wings at said second pivot member;

a foot pedal having a first end and a second end, said first end pivotally connected to said second end of said linkage arm at a third pivot member and said second end pivotally connected with a distal end of said body base member at a fourth pivot member, whereby pressure applied to said foot pedal causes axial movement of said linkage arm to cause pivoting of said distal end of said cover extension around said fixed pivot position thereby raising said cover member up to a position at least ninety degrees from a closed position;

spring biasing device to close said cover member against said peripheral rim when pressure is removed from said foot pedal; and an enclosure member attached to said top edges of said bracket members and enclosing said first, second and third pivot members and said linkage arm, said enclosure member defining a stop portion to limit travel of said extension of said cover member during lifting of said cover member.

12. The apparatus of claim 11 wherein: said body member has a bottom member integrally formed with said peripheral wall of said body member, said bottom member forming an upper surface of a second cavity within said body member and said first absorbent pad resting on said bottom member;

said base member of said body forms a lower surface of said second cavity, said base member defining an opening into said second cavity; and said apparatus further comprising a removable closure for said opening, said second cavity and said closure providing for the insertion of weight within said second cavity to reduce movement of said apparatus during operation of said foot pedal.

13. The apparatus of claim 11 wherein: said second set of wings and said first end of said linkage arm are configured to permit axial motion with respect to an axis of said second pivot member to permit assembly and disassembly of said second pivot member;

said second end of said linkage arm and said first end of said foot pedal member are configured to permit axial motion for assembly and disassembly of said third pivot member; and said second end of said foot pedal and said base member of said body member are configured to permit axial motion for assembly and disassembly of fourth pivot member.

14. The apparatus of claim 11 wherein both said peripheral rim of said body member and said under surface of said cover member are provided with cooperating resilient gasket to provide a seal for said cavity and a protection for any fishing line extending from said cavity when said cover member is in a closed position.

15. The apparatus of claim 11 wherein said spring biasing device comprises a spring member including a first hook-like end and a second hook-like end, said first hook-like end releasably secured to a wall hook carried by an outer wall of said body member at a location between said brackets, said second hook-like end releasably secured to an eyelet defined by a central extension carried by said foot pedal such that said spring member biases said foot pedal in a raised position and said cover member in a closed position.

16. An apparatus for treating fishing components with a topical treating liquid without contact of a user's hands or clothing with said liquid, said apparatus comprising:

a body member defining a cavity with a cylindrical wall having a peripheral rim, a bottom of said cavity defined by a transverse solid member integrally formed with said wall, said body member further having a base member substantially parallel with said transverse member thereby defining a second cavity between said transverse member and said base member, said base member defining an opening into said second cavity, and bracket members extending from an exterior surface of said wall, said bracket members having bracket extensions extending from a lower end of said bracket members and being supported by said base member;

a generally circular cover member for closing said cavity of said body member, said cover member having a lower surface for engaging said peripheral rim, said cover member having a cover extension for overlying said upper edge of said bracket members, said cover extension carrying a first set of wings and a second set of wings, said first set of wings extending downward from opposite sides of said cover extension at an intermediate location, said second set of wings extending downward from opposite sides of said cover extension at a distal end of said cover extension;

a first resilient and absorbent pad contained in said cavity and supported on said transverse member for retaining said topical treating liquid;

a second resilient and absorbent pad, having a thickness substantially equal to said first absorbent pad, attached to said lower surface of said cover member for retaining said topical treating liquid, said second absorbent pad substantially contacting said first absorbent pad within said cavity when said lower surface of said cover member is in contact with said peripheral rim whereby said first and said second absorbent pad substantially enclose said fishing components when placed within said cavity;

removable closure device for said opening into said second cavity for facilitating insertion of weight into said second cavity to provide stability of said body member on a supporting surface;

a first pivot member located at said first set of wings of said cover extension, said first set of wings being journaled in said bracket members to provide a fixed pivot position for said cover member;

a second pivot member located at said second set of wings of said cover extension;

a linkage arm having a first end and a second end, said first end pivotally connected to said second set of wings at said second pivot member;

a foot pedal having a first end and a second end, said first end pivotally connected to said second end of said linkage arm at a third pivot member and said second end pivotally connected with a distal end of said body base member at a fourth pivot member, whereby pressure applied to said foot pedal causes axial movement of said linkage arm to cause pivoting of said distal end of said cover extension around said fixed pivot position thereby raising said cover member up to a position at least ninety degrees from a closed position;

spring biasing device to close said cover member against said peripheral rim when pressure is removed from said foot pedal, said spring biasing device comprising a spring member including a first hook-like end and a second hook-like end, said first hook-like end releasably secured to a wall hook carried by an outer wall of said body member at a location between said brackets, said second hook-like end releasably secured to an eyelet defined by a central extension carried by said foot pedal such that said spring member biases said foot pedal in a raised position and said cover member in a closed position; and enclosure member attached to said top edges of said bracket members and enclosing said first, second and third pivot member and said linkage arm, said enclosure member defining a stop portion to limit travel of said extension of said cover member during lifting of said cover member.

17. The apparatus of claim 16 wherein: said second set of wings and said first end of said linkage arm are configured to permit axial motion with respect to an axis of said second pivot member to permit assembly and disassembly of said second pivot member;

said second end of said linkage arm and said first end of said foot pedal member are configured to permit axial motion for assembly and disassembly of said third pivot member; and said second end of said foot pedal and said base member of said body member are configured to permit axial motion for assembly and disassembly of said fourth pivot member.

* * * * *